Jan. 10, 1961
W. C. JOHNSON, JR
2,967,573
PNEUMATIC AIRFOIL
Filed Oct. 14, 1954
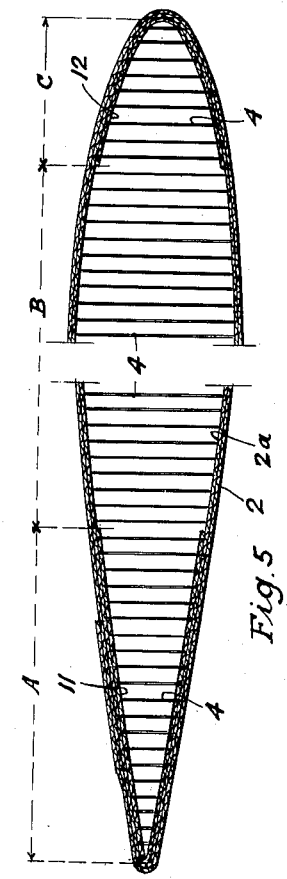
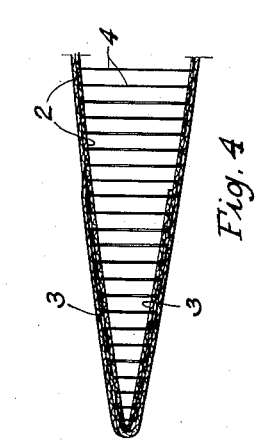
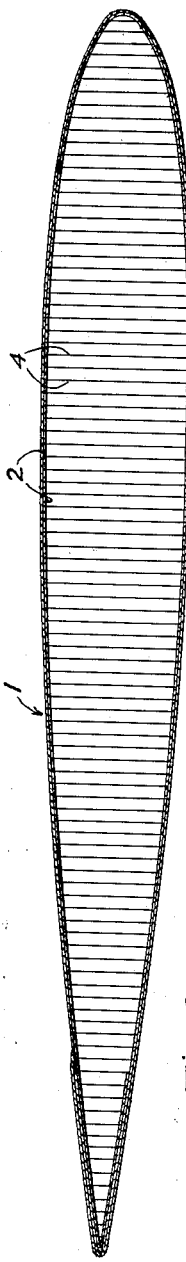
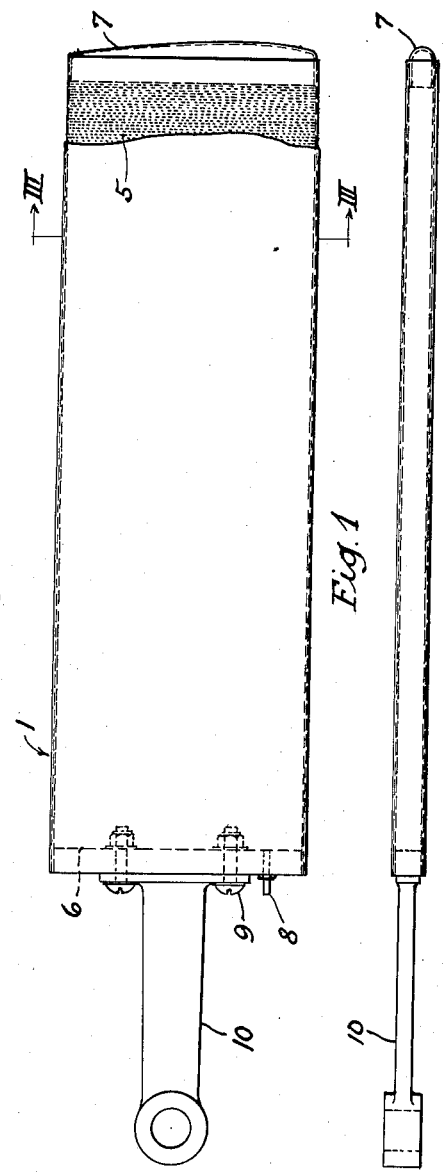
INVENTOR.
William C. Johnson, Jr.
BY
ATTORNEY

United States Patent Office 2,967,573
Patented Jan. 10, 1961

2,967,573
PNEUMATIC AIRFOIL

William C. Johnson, Jr., Mantua, Ohio, assignor to Goodyear Aircraft Corporation, Akron, Ohio, a corporation of Delaware Filed Oct. 14, 1954, Ser. No. 462,330

2 Claims. (Cl. 170—159)

This invention relates to the construction of airfoils applicable for aircraft rotor blades, fins, control surfaces and the like, and in particular to pneumatic airfoils made of airtight fabric to form stable and strong structures of low weight.

Heretofore it has been the practice to make rotor blades and other airfoil-shaped parts of an aircraft of rigid structural material involving considerable weight. In some cases it has been found advantageous to make such parts retractable for storage or other purposes. However, such constructions are rather complicated, heavy and high in cost.

It is the general object of the invention to avoid and overcome the foregoing and other difficulties of and objections to prior art practices by a construction which is simple, light in weight, low in cost, and collapsible for storage purposes.

The aforesaid objects of the invention and other objects, which will become apparent as the description proceeds, are achieved by replacing an airfoil made of rigid material substantially by a fabric structure inflated by air of required pressure to give the airfoil the necessary strength and rigidity for the purpose intended.

For a better understanding of the invention reference should be had to the accompanying drawing, wherein Fig. 1 is a plan view of one embodiment of the invention illustrating a helicopter rotor blade, Fig. 2 is a front view thereof, Fig. 3 is in enlarged scale a cross-sectional view taken on III—III of Fig. 1, Fig. 4 is a detail of Fig. 3, Fig. 5 is a fragmental cross-sectional view of a modified rotor blade construction.

With specific reference to the form of the invention illustrated in the drawing, the numeral 1 indicates in general the streamline-shaped envelope of a helicopter rotor blade composed of a plurality of plies of, preferably, neoprene-impregnated synthetic fabric such as nylon or similar high strength material. The envelope 1 is composed of a plurality of fabric plies 2 which, cemented together with neoprene, may vary in thickness. Each ply is looped backwards at the leading edge and one side thereof folded at the trailing edge with the folded portion 3 united with the free edge portion of the opposite side of the ply ending at the trailing edge. The opposite sides of the innermost ply 2 are connected by substantially inextensible tie threads 4, approximately 25 to 100 in number per square inch surface, depending on the inflation pressure required. The thread lengths between the opposite sides of the inner ply 2 is made such that the envelope 1 when air-inflated at the desired pressure will have the correct cross-sectional shape. The tie threads may be either sewed by a suitable sewing device through the opposite sides of the innermost ply 2 when held in proper position, or they may be woven together in known manner with the ply material.

In using the sewing method, the innermost ply 2 when formed into profile contour, is sewed with tie threads 4 through both sides in closely spaced transverse planes 5 and with neoprene applied to the stitches to prevent slipping of the tie threads. Additional plies in suitable number and desired thickness are then added for strength and sealing purposes. One or the other ply may be laid bias to straight plies with heavier plies on the inside. All of these plies are constructed similar to the innermost ply 2 described above. The airfoil-shaped rigid end pieces 6 and 7 secured within the root end and tip end of the envelope respectively, and the tie threads 4 under tension, when the envelope 1 is pressurized by means of check valve 8, serve to fix the envelope airfoil shape. The end piece 6, attached by bolts 9 to the root 10, may be made of wood or other suitable material and the tip end 7, for the sake of light weight, advantageously of impregnated glass fibre cloth or of other resin-impregnated fabric.

In Fig. 5 is shown a modification of the structural assembly of the airfoil envelope 1 in so far as the tie threads 4 are interwoven with the greatest portion 3 of the width of the innermost fabric ply 2a, which extends in two separate pieces from the center of the leading edge to the center of the trailing edge of the envelope, whereas the portions A and B of ply 2a are united, respectively, with the V-shaped trailing edge insert 11 and the looped leading edge insert 12, both of which are provided with sewed-in tie threads 4. Interweaving of the tie threads with the ply material makes it necessary that the innermost ply 2a remains open a certain width at front and rear and thus requires a change of the construction of the innermost envelope ply. All additional plies, however, remain the same as with an envelope using the sewing method for the full width.

Although the illustration in the drawing shows a streamlined airfoil cross-section of a helicopter rotor blade having a single air compartment it may be advantageous in some cases to divide the rotor blade at its greatest thickness in two separate sections, that is, a fore section and an aft section to be united by suitable tie members. The front section, carrying the greater load could be made of heavier material at greater internal pressure and the rear section, carrying the smaller load, of lighter material at lower internal pressure.

From the foregoing it will be recognized that the objects of the invention have been achieved in providing a collapsible, spacing saving, airfoil construction which is simple, light of weight and relatively low in cost.

While certain representative embodiments and details have been shown for the purpose of illustrating the invention, it will be apparent to those skilled in this art that various changes and modifications may be made therein without departing from the spirit or scope of the invention.

What is claimed:

1. A lifting airfoil for an aircraft including a flexible, airtight, fabric envelope of streamlined shape in vertical cross-section, a plurality of flexible, substantially nonextensible threads in a number between about 25 and about 100 per square inch positioned in substantially parallel relationship inside the envelope and extending substantially vertically between and connecting the top and bottom surfaces of the envelope, rigid end pieces of the same streamlined shape as the envelope inserted and secured into and closing the ends of the envelope, the threads being of progressively greater length from the leading edge of the envelope to about the middle thereof and then being of progressively shorter length towards the trailing edge of the envelope to hold the envelope in streamlined shape, gas under pressure in the envelope to tension the threads thereof, and valve means for inflating and deflating the envelope.

2. A lifting airfoil for an aircraft including a flexible, airtight, fabric envelope of streamlined shape in vertical cross-section, a plurality of flexible, substantially non-extensible threads positioned in substantially parallel relationship inside the envelope and extending substantially vertically between and connecting the top and bottom surfaces of the envelope, means closing the ends of the envelope, the threads being of progressively greater length from the leading edge of the envelope to about the middle thereof and then being of progressively shorter length towards the trailing edge of the envelope to hold the envelope in streamlined shape, gas under pressure in the envelope to tension the threads thereof, and valve means for inflating and deflating the envelope.

References Cited in the file of this patent

UNITED STATES PATENTS

| | | |
|---|---|---|
| 2,410,609 | Pecker | Nov. 5, 1946 |
| 2,502,101 | Morgan et al. | Mar. 28, 1950 |
| 2,616,509 | Thomas | Nov. 4, 1952 |
| 2,632,480 | MacIntyre | Mar. 24, 1953 |
| 2,657,716 | Ford | Nov. 3, 1953 |
| 2,657,884 | Merrill | Nov. 3, 1953 |
| 2,698,020 | Phane | Dec. 28, 1954 |

FOREIGN PATENTS

| | | |
|---|---|---|
| 8,290 | Great Britain | of 1910 |
| 28,704 | Great Britain | 1911 |
| 522,042 | Great Britain | June 6, 1940 |
| 660,793 | Germany | June 2, 1938 |